US012572705B2

(12) United States Patent
Rakshit et al.

(10) Patent No.: US 12,572,705 B2
(45) Date of Patent: Mar. 10, 2026

(54) COLLABORATIVE DIGITAL BOARD

(71) Applicant: International Business Machines Corporation, Armonk, NY (US)

(72) Inventors: Sarbajit K. Rakshit, Kolkata (IN); Harish Bharti, Pune (IN); Rakesh Shinde, Pune (IN); Abhay Kumar Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 17/454,295

(22) Filed: Nov. 10, 2021

(65) Prior Publication Data

US 2023/0143785 A1 May 11, 2023

(51) Int. Cl.
| | |
|---|---|
| *G06F 21/62* | (2013.01) |
| *G06F 3/0481* | (2022.01) |
| *G06F 3/04842* | (2022.01) |
| *G06F 21/84* | (2013.01) |
| *G09G 3/00* | (2006.01) |
| *H04L 65/401* | (2022.01) |
| *G06F 3/0354* | (2013.01) |
| *G09B 11/00* | (2006.01) |
| *H04M 3/56* | (2006.01) |

(52) U.S. Cl.
CPC ............ *G06F 21/84* (2013.01); *G06F 3/0481* (2013.01); *G06F 3/04842* (2013.01); *G06F 21/629* (2013.01); *G09G 3/008* (2013.01); *H04L 65/401* (2022.05); *G06F 3/03545* (2013.01); *G09B 11/00* (2013.01); *G09G 2370/16* (2013.01); *H04M 3/56* (2013.01)

(58) Field of Classification Search
CPC .... G06F 3/0481; G06F 3/016; G06F 3/03545; H04M 3/56; G09B 11/00; H04L 65/401; H04L 65/4015
See application file for complete search history.

(56) References Cited

U.S. PATENT DOCUMENTS

| | | | |
|---|---|---|---|
| 7,958,453 B1 * | 6/2011 | Taing ................. | H04L 12/1827 709/204 |
| 10,073,963 B2 | 9/2018 | Tse | |
| 10,572,135 B1 | 2/2020 | Fieldman | |
| 11,412,181 B1 * | 8/2022 | Han ..................... | H04L 65/403 |

(Continued)

OTHER PUBLICATIONS

"Digital Whiteboard on a remote meeting", Downloaded Jun. 14, 2021, 7 pages, <https://explaineverything.com/digital-whiteboard-on-a-remote-meeting/>.
"Put imagination to work", Mural, © 2020 Tactivos, Inc. dba Mural, 8 pages, <https://www.mural.co>.
"V R Conference", Downloaded Jun. 14, 2021, 5 pages, <https://www.mixtive.com/cases/vrconference>.

(Continued)

*Primary Examiner* — William R Korzuch
*Assistant Examiner* — Aditya Sriram
(74) *Attorney, Agent, or Firm* — Edward J. Wixted, III

(57) ABSTRACT

Embodiments of the present invention provide methods, computer program products, and systems. Embodiments of the present invention can. in response to receiving information, map an environment comprising one or more electronic devices. Embodiments of the present invention can then dynamically update the mapped environment based on the received information. Embodiments of the present invention can then display the updated environment on display areas of respective electronic devices of the one or more electronic devices.

18 Claims, 4 Drawing Sheets

(56)          References Cited

U.S. PATENT DOCUMENTS

| | | | |
|---|---|---|---|
| 2006/0212813 A1* | 9/2006 | Yalovsky | G06F 40/169 715/764 |
| 2007/0299710 A1* | 12/2007 | Haveliwala | G06Q 10/10 705/7.19 |
| 2009/0157811 A1* | 6/2009 | Bailor | G06F 40/166 709/204 |
| 2010/0099445 A1* | 4/2010 | Song | H04M 1/0214 455/566 |
| 2010/0275132 A1* | 10/2010 | Hildebrandt | G06F 3/0428 715/752 |
| 2014/0049521 A1* | 2/2014 | Gil | G06F 3/04883 345/179 |
| 2018/0300302 A1* | 10/2018 | Holley | G06F 40/171 |
| 2019/0297126 A1* | 9/2019 | Graziano | H04L 51/08 |
| 2019/0369755 A1* | 12/2019 | Roper | G06F 3/0484 |
| 2023/0122345 A1* | 4/2023 | Blume | H04N 7/147 715/722 |

OTHER PUBLICATIONS

Disclosed Anonymously, "System to Share Visual Data between Connected and Non-Connected Surfaces", An IP.com Prior Art Database Technical Disclosure, IP.com No. IPCOM000249063D, IP.com Electronic Publication Date: Jan. 31, 2017, 3 pages.

Kesavan et al., "Connected Physical and Virtual White Boarding Using Magnetic Robotic Markers and Gesture Recognition Sensors", An IP.com Prior Art Database Technical Disclosure, IP.com No. IPCOM000244647D, IP.com Electronic Publication Date: Jan. 4, 2016, 4 pages.

Myre, Maria, "The 7 best online whiteboards in 2021", Feb. 4, 2021, 10 pages, <https://zapier.com/blog/best-online-whiteboard/>.

Guinness Harry, "The 4 best online whiteboards in 2025", Zapier, Blog, Jun. 16, 2025, 19 pages, https://zapier.com/blog/best-online-whiteboard/.

* cited by examiner

100

COLLABORATIVE DIGITAL BOARD

BACKGROUND

The present invention relates in general to interactive whiteboards and in particular to dynamically adjusting display outputs based on received input.

Generally, an interactive whiteboard (IWB), also known as an interactive board or smart board, is a large interactive display board in the form factor of a whiteboard. It can either be a standalone touchscreen computer used independently to perform tasks and operations or a connectable apparatus used as a touchpad to control computers from a projector. A device driver is usually installed on the attached computer so that the interactive whiteboard can act as a Human Input Device (HID), like a mouse. The computer's video output is connected to a digital projector so that images may be projected on the interactive whiteboard surface.

The user then calibrates the whiteboard image by matching the position of the projected image in reference to the whiteboard using a pointer as necessary. After this, the pointer or other device may be used to activate programs, buttons and menus from the whiteboard itself, just as one would ordinarily do with a mouse. If text input is required, user can invoke an on-screen keyboard or, if the whiteboard software provides for this, utilize handwriting recognition. This makes it unnecessary to go to the computer keyboard to enter text. Thus, an IWB emulates both a mouse and a keyboard. The user can conduct a presentation or a class almost exclusively from the whiteboard.

In addition, most IWBs are supplied with software that provides tools and features specifically designed to maximize interaction opportunities. These generally include the ability to create virtual versions of paper flipcharts, pen and highlighter options, and possibly even virtual rulers, protractors, and compasses—instruments that would be used in traditional classroom teaching.

SUMMARY

According to an aspect of the present invention, there is provided a computer-implemented method. The computer implemented method comprises in response to receiving information, mapping an environment comprising one or more electronic devices; dynamically updating the mapped environment based on the received information; and displaying the updated environment on display areas of respective electronic devices of the one or more electronic devices.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that virtualized collaboration tools have certain deficiencies that can be improved. For example, collaboration tools used in virtualized environments currently lack a virtual white board too. Current interactive whiteboard tools require in person viewing of the physical whiteboard. Embodiments of the present invention provide a virtualized whiteboard that can be embedded with existing virtual collaboration tools. For example, embodiments of the present invention can dynamically update an environment based on received user input and provide feedback that is displayed each time a person edits an environment. In some instances, embodiments of the present invention can prioritize received information and perform a single update to each connected user. Other embodiments of the present invention can be integrated with haptic tools to provide additional feedback and guidance (e.g., instructional simulations). Finally, other embodiments of the present invention can provide a private notepad feature that can be obscured from the view of other participants of a meeting as discussed in greater detail later in this Specification.

Figure 1:
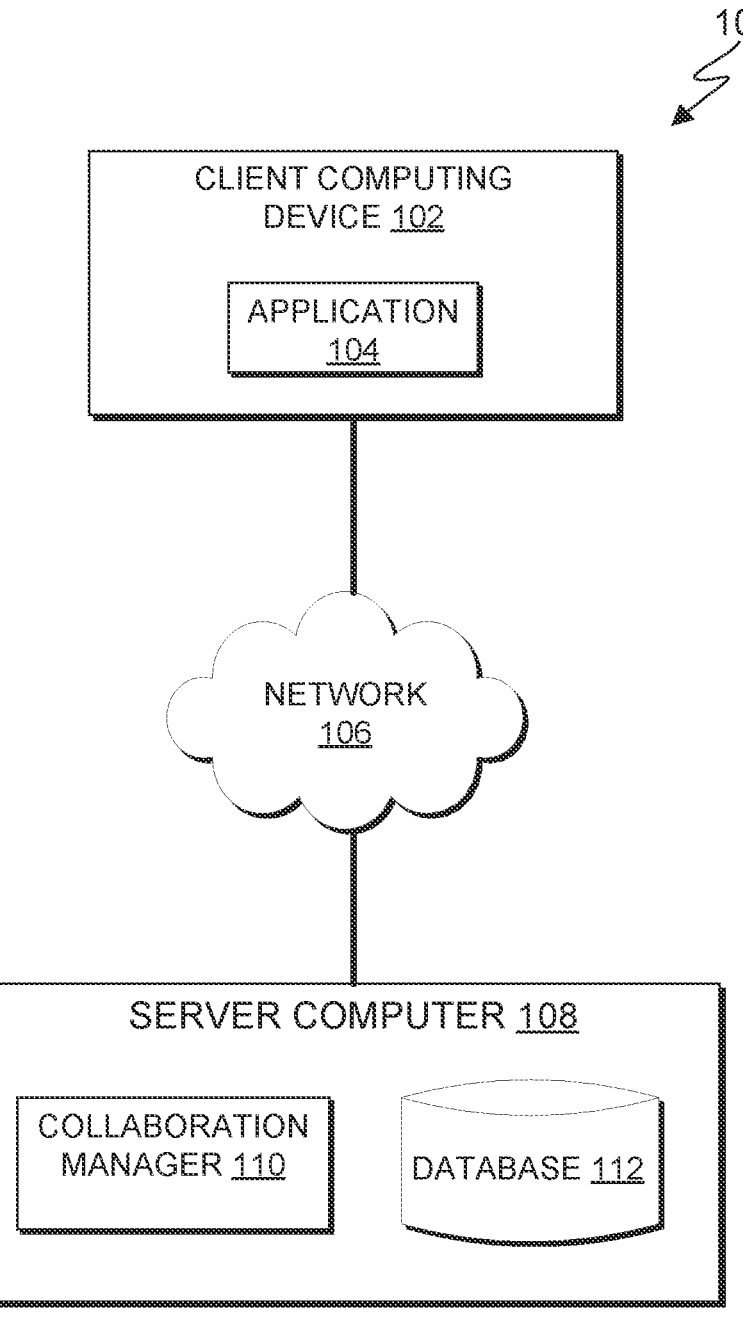
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access collaboration manager 110 (e.g., using TCP/IP) to access content, user information, and database information. Application 104 can further communicate with collaboration manager 110 to transmit instructions to dynamically adjust environment displays such that each user can see what is being edited by other users in a seamless manner as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts collaboration manager 110 and database 112. In this embodiment, collaboration manager 110 resides on server computer 108. In other embodiments, collaboration manager 110 can have an instance of the program (not shown) stored locally on client computer device 102. In other embodiments, collaboration manager 110 can be a standalone program or system that improves collaboration systems by providing those systems with tools that can dynamically adjust environment displays such that each user can see what is being edited by other users in a seamless manner. In yet other embodiments, collaboration manager 110 can be stored on any number or computing devices.

Collaboration manager 110 improves collaboration tools. For example, collaboration manager 110 can improve capabilities of physical whiteboards that are digitally enabled with markers with movement sensors and are Internet of Things (IoT) connected in low latency 5G networks. In some embodiments collaboration manager 110 provides a white board like function that can be embedded within collaborative tools (e.g., video conferencing software) that can dynamically update in response to receiving multiple user inputs. For example, collaboration manager 110 can enable seamless whiteboard such that multiple locations participate and can view the same content and can modify in real time. In some embodiments, collaboration manager 110 can be integrated as a standalone whiteboard tool, flipboard, or personal notebook that can enable selected sharing with other users.

In some instances, collaboration manager 110 can be integrated into an electronic device (e.g., an electronic marker) and be utilized with a 5G network to communicate directly with a physical or virtual whiteboard which can reduce latency for better experience and support many participants which would not be feasible otherwise. In these instances, collaboration manager 110 can directly provide 4D haptic feed on the electronic tool for remote instructional purposes (e.g., guide what to write, how to draw). For example, a user (e.g., a teacher) can provide input (e.g., directional movement) that instructs other users how to draw an object. Collaboration manager 110 can communicate this feedback to help the student draw the desired object. In another example, collaboration manager 110 can provide real time feedback through haptic sensors to instruct a student. Specifically, where a student is drawing a diagram and the instructor (who is in a physically remote location different from the student) notices the error, the instructor can leverage collaboration manager 110 to transmit haptic feedback to correct the student and guide the student to draw the correct diagram.

In instances where collaboration manager 110 can be integrated with an electronic device such as an electronic pen, collaboration manager 110 can map a display area and depict graphics to show users where the electronic pen is pointing to via a 5G network. Collaboration manager 110 can, in some instances be integrated to devices with a scanning feature to load media into a display area.

An environment, as used herein, refers to a digital display area that can be made viewable to one or more users. For example, an environment can be a physical interactive whiteboard, a computer monitor, a tablet, smart phone, etc. In most scenarios, an environment refers to a physical screen but can also include virtual screens (e.g., augmented reality and virtual reality). In some examples, an environment can include more than one digital display areas belonging to respective, multiple users. For example, Participant 1 can have a physical Interactive Whiteboard A and mobile device A (e.g., a mobile phone). Participant 2 can also have a physical Interactive White Board B and mobile device B (e.g., a tablet) while Participant 3 can have a physical Interactive White Board C and mobile device C (e.g., a computer screen). Each of the three participants can be connected through internet or any other network like WAN/MPLS through VPN and part of the same domain of security Authentication and Authorization. Each of those Interactive White Boards can also include respective digital markers connected to the same network and user devices.

Continuing the example above, Participant 1 can update Whiteboard A. During the update collaboration manager 110 can generate feedback and subsequently display the feedback on the whiteboards and user devices of other participants. Feedback, as used herein, refers to one or more graphics that, when displayed alerts users of those respective whiteboards, and user devices. For example, collaboration manager 110 can generate a flashing alert that Participant 1 is updating (e.g., Participant 1 is updating). In this example, the other participants can wait for the update to be completed or can update their respective devices (e.g., white boards, tablets, smart phones, etc.) simultaneously. In instances where more than one participant is updating, collaboration manager 110 can generate multiple feedback that is displayed to each of the respective participants that one or more participants are updating content.

After each instance of received input, collaboration manager 110 can update each of the respective devices to show updated content. In this embodiment, collaboration manager 110 updates content based on detecting an instance of an input device touching a surface (e.g., when a user begins to modify a display area) and detecting when the input device (e.g., electronic marker, stylus, etc.) no longer touches the surface (e.g., when the user lifts the input device from the display area). In other embodiments, collaboration manager 110 may be configured in a manual mode and only update the other connected devices once the user, i.e., participant, confirms that the user is ready to publish the modified content to the other users. In yet other embodiments, collaboration manager 110 can update according to specified increments of time and publish all modified content of connected participants at the specified increments of time (e.g., every ten seconds, thirty seconds, minute, etc.). In some embodiments, collaboration manager 110 can update simultaneously as each participant makes modifications or sequentially by synchronizing connected devices.

Collaboration manager 110 can also provide a private mode mechanism that displays a separate user interface for respective users to interact with. For example, users can enable private mode to generate one or more content that the user does not wish to be made public to the other users on in a meeting. Specifically, users can take notes, scan documents, upload images, and make modifications to content being presented on a main screen that is shared and viewed by other users without the users' knowledge (e.g., hidden from view of other users not included in the private mode) until that user makes those notes publicly available for viewing to all users. In instances where a private mode mechanism is made, collaboration manager 110 may additionally copy content displayed in the dedicated (i.e., main) display area that is visible to the other participants (i.e., users). The user that has enabled the private mode can then manipulate the copied content without making changes to the content shown in the dedicated, main display area.

In some embodiments, collaboration manager 110 can then, at the request of the user, merge content from the private mode to the main environment. For example, Participant 1 can enable a private mode and make notations and edit without the other participants knowledge. At some time, Participant 1 can select the option to display either notes taken by Participant 1 or changes made to content being shown in the main display area (e.g., changes made to the copy of content displayed in the main display area) to the other users. In response to receiving Participant 1's request, collaboration manager 110 can merge content that Participant 1 added in the private mode to the main display area. In other embodiments, collaboration manager 110 can enable a private mode for a group of users or a subset of a group of users and subsequently merge content added or modified in the private mode with the other users, i.e., participants, that are not part of the private mode group.

Database 112 stores received information and can be representative of one or more databases that give permissioned access to collaboration manager 110 or publicly available databases. For example, database 112 can store environment information associated with the user. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
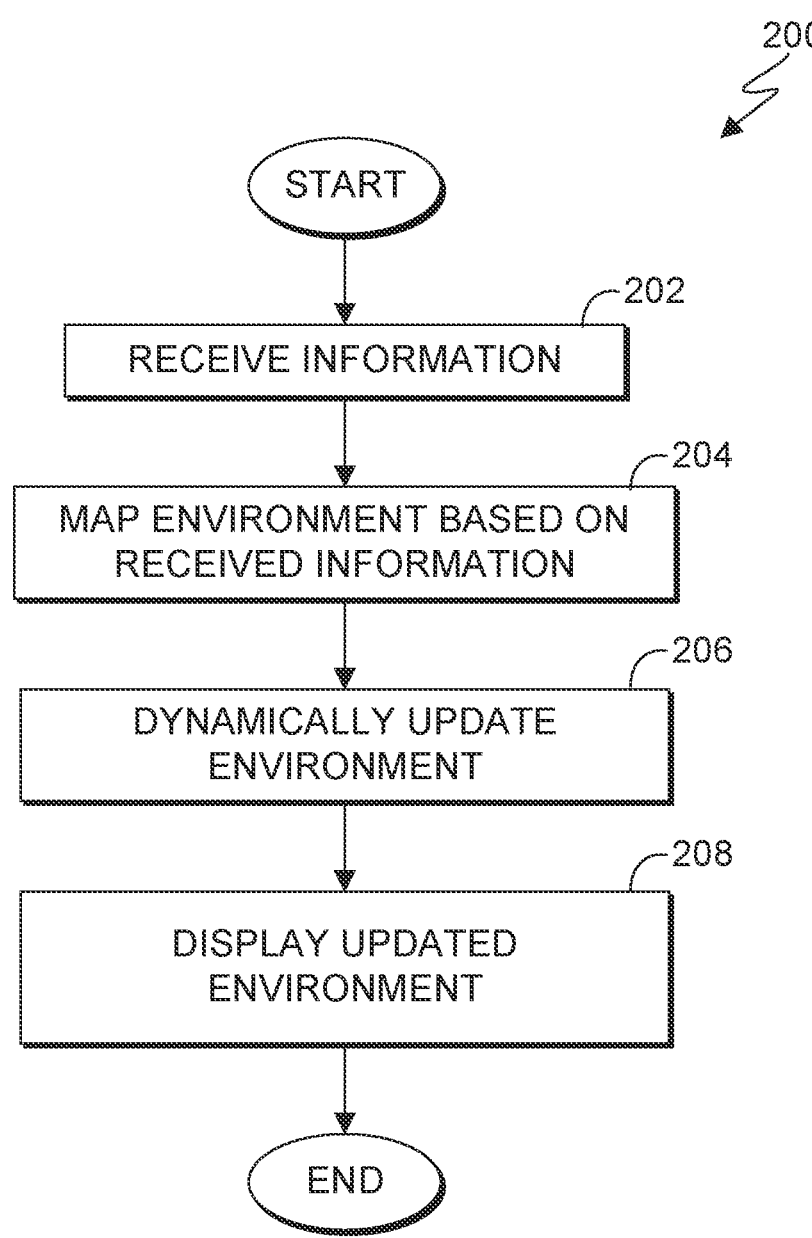
FIG. 2 is a flowchart depicting operational steps for dynamically updating an environment, in accordance with an embodiment of the present invention.

FIG. 2 is a flowchart 200 depicting operational steps for dynamically updating an environment, in accordance with an embodiment of the present invention.

In step 202, collaboration manager 110 receives information. In this embodiment, collaboration manager 110 receives a request from client computing device 102. In other embodiments, collaboration manager 110 can receive information from one or more other components of computing environment 100.

Information received by collaboration manager 110 refers to information pertaining to a display area within an environment. For example, collaboration manager 110 can receive information from one or more connected IoT devices (e.g., smart phones, tablets, computer screens, laptops, Interactive White Boards, collaboration tools, home automation devices, wireless devices, Bluetooth connected devices, electronic devices, etc.) and one or more collaboration applications (e.g., video conferencing applications). In some embodiments, collaboration manager 110 can receive information comprising environmental layouts (e.g., display area information).

In this embodiment, collaboration manager 110 can optionally transmit a request to IoT connected devices within an area to send and register respective UUIDs. For example, collaboration manager 110 can request IoT devices (e.g., smart phones) to connect the devices.

In step 204, collaboration manager 110 maps an environment based on received information. In this embodiment, collaboration manager 110 maps an environment by identifying one or more connected devices and their respective locations and capabilities. In this embodiment, collaboration manager 110 can collect information streams from various data sources (e.g., IoT connected devices, etc.) that are capable of displaying and inputting information to the environment.

In this embodiment, collaboration manager 110 can collect additional information from one or more other services by invoking an in-bound API which then initiates a MAC based trajectory path request for all the devices in the area. In this embodiment, an in-bound approach of communication includes control framed of MAC (Media Access Control) protocol and collaboration manager 110 invokes an in-bound API across the common external data collector service in 5G domain wherein the static platform data can be accessed. In this way, collaboration manager 110 can collect static data that includes platform identification, hardware specification and model internal architecture is collected from the MAC based service interconnect manager. Examples of static data can include hardware default settings. Collaboration manager 110 can then parse the collected information using a regex-based document classifier and saved in metadata mappers.

In step 206, collaboration manager 110 dynamically updates the environment. In this embodiment, collaboration manager 110 dynamically updates the environment by prioritizing received information, ordering the received information, and providing feedback as discussed in greater detail with respect to FIG. 3. For example, collaboration manager 110 can display one or more graphics to each of the one or more connected devices to show, in real time, which user (i.e., participant) is modifying the content.

In step 208, collaboration manager 110 displays the updated environment. In this embodiment, collaboration manager 110 displays the updated environment according to display preferences of respective users. For example, in some embodiments, collaboration manager 110 can update simultaneously as each participant makes modifications or sequentially by synchronizing connected devices. In other instances, collaboration manager 110 can display graphics to show the environment being modified by respective participants and subsequently display the updated environment as showing combined received input from all participants.

In this embodiment, collaboration manager 110 updates content based on detecting an instance of an input device touching a surface (e.g., when a user begins to modify a display area) and detecting when the input device (e.g., electronic marker, stylus, etc.) no longer touches the surface (e.g., when the user lifts the input device from the display area).

As discussed above, collaboration manager 110 can be utilized with haptic technology. In these instances, collaboration manager 110 can directly provide 4D haptic feed on the electronic tool for remote instructional purposes (e.g., guide what to write, how to draw). For example, a user (e.g., a teacher) can provide input (e.g., directional movement) that instructs other users how to draw an object. Collaboration manager 110 can communicate this feedback to help the student draw the desired object. In another example, collaboration manager 110 can provide real time feedback through haptic sensors to instruct a student. Specifically, where a student is drawing a diagram and the instructor (who is in a physically remote location different from the student) notices the error, the instructor can leverage collaboration manager 110 to transmit haptic feedback to correct the student and guide the student to draw the correct diagram.

Collaboration manager 110 can also display a control or command center that allows controls over private mode functionalities. For example, users can enable private mode to generate one or more content that the user does not wish to be made public to the other users on in a meeting. Specifically, users can take notes, scan documents, upload images, and make modifications to content being presented on a main screen that is shared and viewed by other users without the user's knowledge until that user makes those notes publicly available for viewing to all users.

Figure 3:
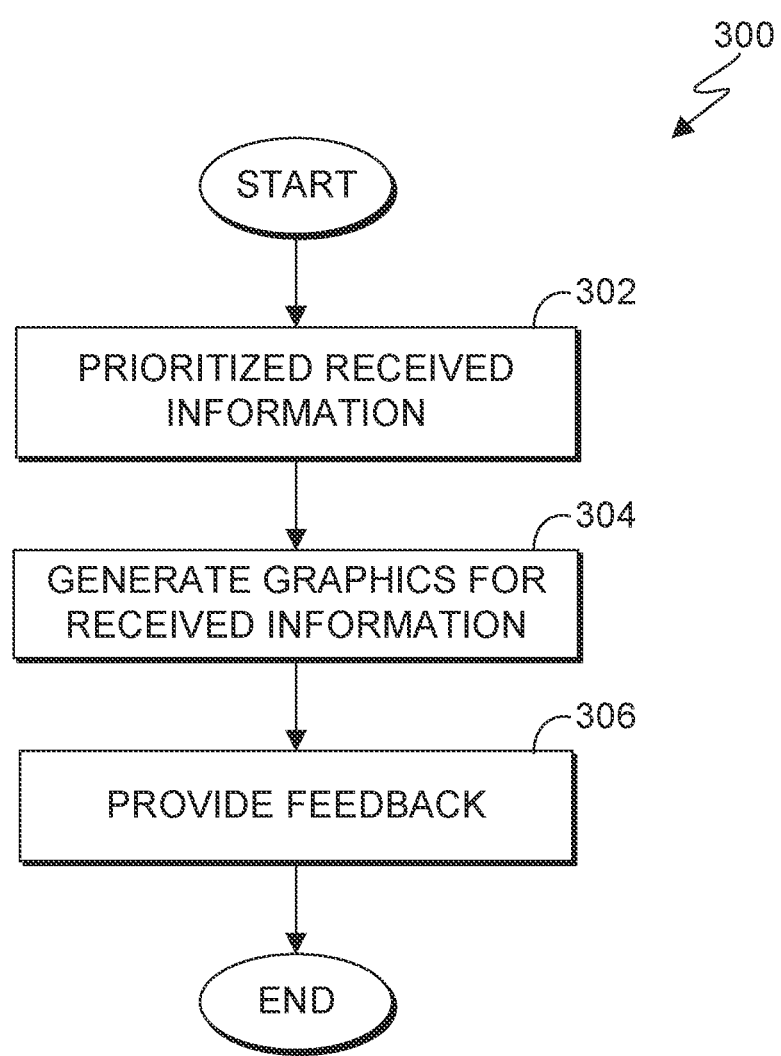
FIG. 3 is a flowchart for prioritizing received information, in accordance with an embodiment of the present invention.

FIG. 3 is a flowchart 300 for prioritizing received information, in accordance with an embodiment of the present invention.

In step 302, collaboration manager 110 prioritizes received information. In this embodiment, collaboration manager 110 can prioritize received information based on the order in which collaboration manager 110 receives edits (i.e., modifications) to content. In some instances, collaboration manager 110 can lock editing features such that the first participant (e.g., host) must relinquish control or otherwise publish the first participant's edits before a subsequent participant can edit the environment.

In step 304, collaboration manager 110 generates graphics for the received information. In this embodiment, collaboration manager 110 generates graphics that correspond to each of the participants in response to receiving those respective participants' modifications. For example, collaboration manager 110 can generate graphics for Participant 1 each time collaboration manager 110 detects input for Participant 1. For example, collaboration manager 110 can generate a graphic that is subsequently display to each of the connected devices that, "Participant 1 is editing". In some embodiments, collaboration manager 110 can generate a corresponding graphic to show locations on the display area environment that the respective user is modifying.

In step 306, collaboration manager 110 provides feedback. In this embodiment, collaboration manager 110 provides feedback by displaying the generated graphics. For example, collaboration manager 110 can generate a graphic that is subsequently display to each of the connected devices that, indicates respective users are actively editing or otherwise modify content in the display area. In some embodiments, collaboration manager 110 can generate a corresponding graphics to show locations in real time on the display area environment that the respective user is modifying. Collaboration manager 110 can then display the generated graphics in the order the corresponding input was received. For example, collaboration manager 110 can generate cursor graphics for each respective user having different colors to indicate a respective user and show cursor movement. In other embodiments, collaboration manager 110 can generate graphics for each received input within a specified window, compile the generated graphics, and display each of the generated graphics in a completed sequence to show respective edits (e.g., in a time-lapse type of fashion). In some embodiments, collaboration manager 110 can generate a graphic that outlines the area in which a user is making changes. In yet other embodiments, collaboration manager 110 can provide feedback by locking edit functions at the request of a primary user.

Figure 4:
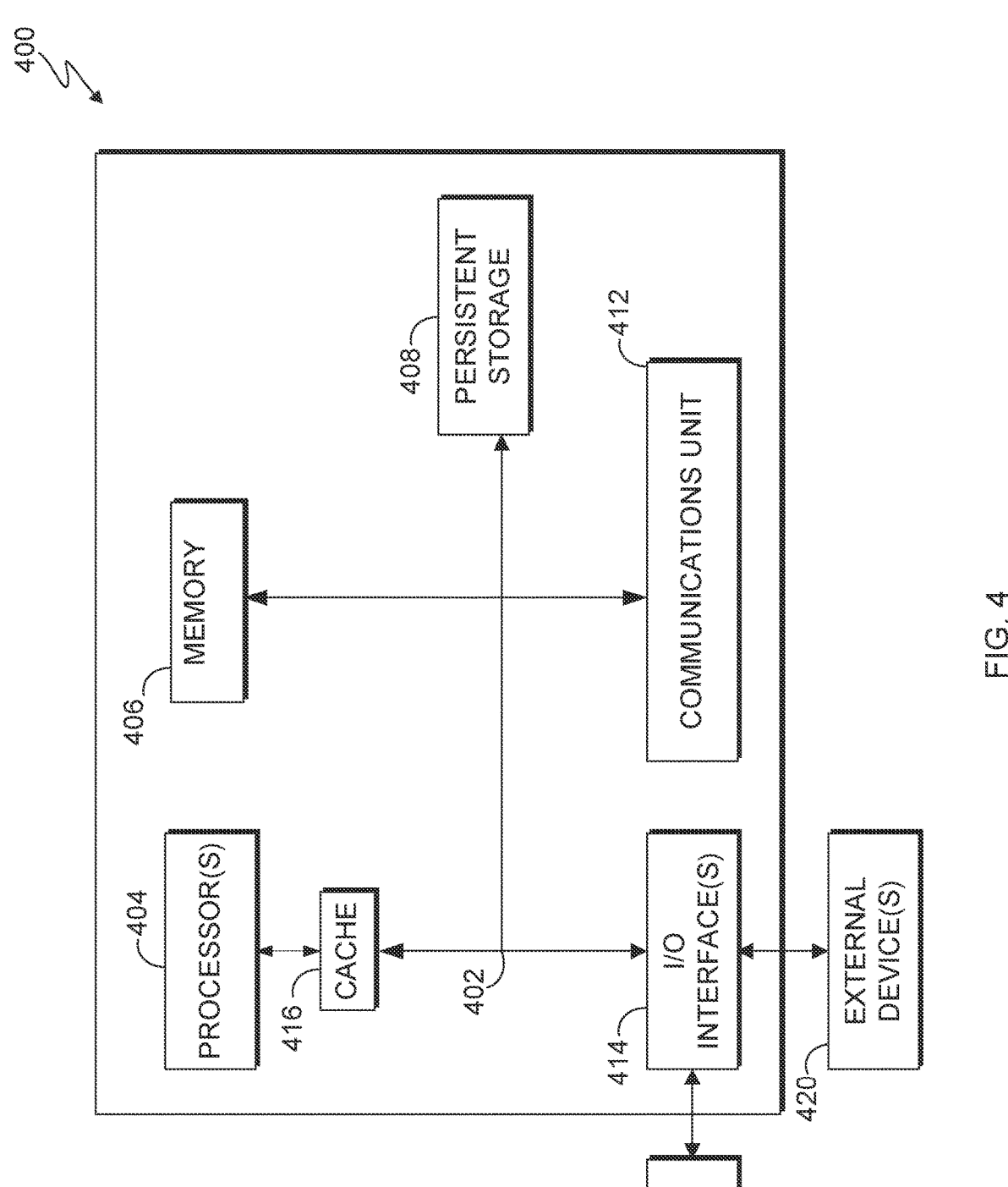
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Collaboration manager 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Collaboration manager 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., collaboration manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, information from an interactive whiteboard (IWB), wherein the IWB is an interactive display board in a form factor of a whiteboard and the information comprises a first input to the IWB using an electronic marker with movement sensors;
responsive to receiving information, mapping, by the one or more processors, an environment comprising the IWB and one or more electronic devices;
dynamically updating, by the one or more processors, the environment comprising the one or more electronic devices based on the received information;
causing, by the one or more processors, the updated environment to be displayed on respective display areas of each electronic device of the one or more electronic devices;
enabling, by the one or more processors, a private mode for modifying a private environment, wherein the private mode is for a subset of a group of users of the one or more electronic devices;
receiving, by the one or more processors, edits in the private mode by the subset of the group of users;
responsive to receiving the edits in the private mode by the subset of the group of users, copying, by the one or more processors, content of the environment and adding the edits to the copied content of the environment;
receiving, by the one or more processors, a request, by a user of the subset of the group of users, to merge content from the private mode;
responsive to receiving the request, causing, by the one or more processors, the edits to be updated on the respective display areas of each electronic device of the one or more electronic devices; and
causing, by the one or more processors, guided haptic feedback to be provided directly to the electronic marker to complete a task on the IWB, wherein a second input to cause the guided haptic feedback is received from an electronic device of the one or more electronic devices.

2. The computer-implemented method of claim 1, wherein dynamically updating the environment comprising the one or more electronic devices based on the received information comprises:
prioritizing, by the one or more processors, received information; and
generating, by the one or more processors, graphics for the received information.

3. The computer-implemented method of claim 2, further comprising:
providing, by the one or more processors, feedback, in real time, using the generated graphics.

4. The computer-implemented method of claim 1, further comprising:
creating, by the one or more processors, a dedicated area for a respective user to make edits that are hidden from view of other respective users.

5. The computer-implemented method of claim 4, wherein the edits comprise one or more text inputs, one or more scanned inputs, and one or more graphics generated by a user.

6. The computer-implemented method of claim 1, wherein receiving the information from the IWB comprises:
detecting, by the one or more processors, an input device touching a surface of the IWB;
receiving, by the one or more processors, a modification of a display area on the IWB by the input device; and
detecting, by the one or more processors, the input device no longer touching the surface of the IWB.

7. The computer-implemented method of claim 1, wherein:
the IWB is a connectable apparatus used as a touchpad to control a computer from a projector; and
video output from the computer is projected on the IWB using the projector.

8. The computer-implemented method of claim 1, wherein the electronic marker is connected to the IWB using a 5G network.

9. The computer-implemented method of claim 1, wherein causing the updated environment to be displayed on the respective display areas of each electronic device of the one or more electronic devices further comprises displaying, by the one or more processors, a flashing alert indicating that a participant using the IWB is updating.

10. A computer program product comprising:
one or more computer readable storage media; and
program instructions stored on the one or more computer readable storage media to perform operations comprising:
receiving information from an interactive whiteboard (IWB), wherein the IWB is an interactive display board in a form factor of a whiteboard and the information comprises a first input to the IWB using an electronic marker with movement sensors;
responsive to receiving information, mapping an environment comprising the IWB and one or more electronic devices;
dynamically updating the environment comprising the one or more electronic devices based on the received information;
causing the updated environment to be displayed on respective display areas of each electronic device of the one or more electronic devices;
enabling a private mode for modifying a private environment, wherein the private mode is for a subset of a group of users of the one or more electronic devices;
receiving edits in the private mode by the subset of the group of users;
responsive to receiving the edits in the private mode by the subset of the group of users, copying content of the environment and adding the edits to the copied content of the environment;
receiving a request, by a user of the subset of the group of users, to merge content from the private mode;
responsive to receiving the request, causing the edits to be updated on the respective display areas of each electronic device of the one or more electronic devices; and
causing guided haptic feedback to be provided directly to the electronic marker to complete a task on the IWB, wherein a second input to cause the guided haptic feedback is received from an electronic device of the one or more electronic devices.

11. The computer program product of claim 10, wherein the dynamically updating the environment comprising the one or more electronic devices based on the received information comprise comprises:

prioritizing received information; and generating graphics for the received information.

12. The computer program product of claim 11, wherein the operations further comprise:

providing feedback, in real time, using the generated graphics.

13. The computer program product of claim 10, wherein the operations further comprise:

creating a dedicated area for a respective user to make edits that are hidden from view of other respective users.

14. The computer program product of claim 13, wherein the edits comprise one or more text inputs, one or more scanned inputs, and one or more graphics generated by a user.

15. A computer system comprising:

a processor set;

one or more computer readable storage media; and program instructions stored on the one or more computer readable storage media to cause the processor set to perform operations comprising:

receiving information from an interactive whiteboard (IWB), wherein the IWB is an interactive display board in a form factor of a whiteboard and the information comprises a first input to the IWB using an electronic marker with movement sensors;

responsive to receiving information, mapping an environment comprising the IWB and one or more electronic devices;

dynamically updating the environment comprising the one or more electronic devices based on the received information;

causing the updated environment to be displayed on respective display areas of each electronic device of the one or more electronic devices;

enabling a private mode for modifying a private environment, wherein the private mode is for a subset of a group of users of the one or more electronic devices;

receiving edits in the private mode by the subset of the group of users;

responsive to receiving the edits in the private mode by the subset of the group of users, copying content of the environment and adding the edits to the copied content of the environment;

receiving a request, by a user of the subset of the group of users, to merge content from the private mode;

responsive to receiving the request, causing the edits to be updated on the respective display areas of each electronic device of the one or more electronic devices; and causing guided haptic feedback to be provided directly to the electronic marker to complete a task on the IWB, wherein a second input to cause the guided haptic feedback is received from an electronic device of the one or more electronic devices.

16. The computer system of claim 15, wherein the dynamically updating the environment comprising the one or more electronic devices based on the received information comprise comprises:

prioritizing received information; and generating graphics for the received information.

17. The computer system of claim 16, wherein the operations further comprise:

providing feedback, in real time, using the generated graphics.

18. The computer system of claim 15, wherein the operations further comprise:

creating a dedicated area for a respective user to make edits that are hidden from view of other respective users.

* * * * *